(12) United States Patent
Nishida et al.

(10) Patent No.: US 11,070,694 B2
(45) Date of Patent: Jul. 20, 2021

(54) IMAGE PROCESSING APPARATUS FOR CONTROLLING A SCANNER

(71) Applicant: FUJIFILM Business Innovation Corp., Tokyo (JP)

(72) Inventors: Tomoyo Nishida, Yokohama (JP); Yuichi Kawata, Yokohama (JP); Hideki Yamasaki, Yokohama (JP); Ryoko Saitoh, Yokohama (JP); Yoshifumi Bando, Yokohama (JP); Kensuke Okamoto, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 171 days.

(21) Appl. No.: 16/162,137

(22) Filed: Oct. 16, 2018

(65) Prior Publication Data

US 2019/0089857 A1 Mar. 21, 2019

(30) Foreign Application Priority Data

Aug. 21, 2017 (JP) .............................. JP2017-158895

(51) Int. Cl.
*H04N 1/04* (2006.01)
*H04N 1/00* (2006.01)
*H04N 1/10* (2006.01)

(52) U.S. Cl.
CPC ..... *H04N 1/00803* (2013.01); *H04N 1/00809* (2013.01); *H04N 1/00816* (2013.01); *H04N 1/00824* (2013.01); *H04N 1/00928* (2013.01); *H04N 1/1061* (2013.01)

(58) Field of Classification Search
None
See application file for complete search history.

(56) References Cited

U.S. PATENT DOCUMENTS

| 7,460,692 | B2 * | 12/2008 | Mizutani .................. G07C 9/37 |
| | | | 382/118 |
| 7,969,409 | B2 * | 6/2011 | Krepec ................. G06F 3/0425 |
| | | | 345/156 |
| 10,419,631 | B2 * | 9/2019 | Okamoto et al. .. H04N 1/00474 |

(Continued)

FOREIGN PATENT DOCUMENTS

| JP | 10-260773 A | 9/1998 |
| JP | 10-268708 A | 10/1998 |

(Continued)

OTHER PUBLICATIONS

Office Action dated Apr. 27, 2021, issued by the Japan Patent Office in counterpart Japanese Patent Application No. 2017-158895.

*Primary Examiner* — Cheukfan Lee
(74) *Attorney, Agent, or Firm* — Sughrue Mion, PLLC

(57) ABSTRACT

An image processing apparatus includes: an image reading unit that reads an image of a document according to an instruction of an operator; an acquiring unit that acquires information on the operator performing document reading, or information on motions of the operator performed on the image processing apparatus in order to perform document reading; and a display that performs display for receiving an input for document reading, based on the line of sight, from the operator, when the information acquired by the acquiring unit satisfies a predetermined condition.

14 Claims, 14 Drawing Sheets

(56) References Cited

U.S. PATENT DOCUMENTS

| | | | | |
|---|---|---|---|---|
| 10,681,238 B2* | 6/2020 | Nakao | ................ | H04N 1/00997 |
| 2012/0200874 A1* | 8/2012 | Kohara | ............. | H04N 1/00408 |
| | | | | 358/1.12 |
| 2013/0155041 A1* | 6/2013 | Yanai | ............... | H04N 21/42202 |
| | | | | 345/207 |
| 2013/0258424 A1* | 10/2013 | Ono | ................... | H04N 1/00323 |
| | | | | 358/475 |
| 2013/0321858 A1* | 12/2013 | Takabatake | ............. | G06F 3/042 |
| | | | | 358/1.15 |
| 2014/0092417 A1* | 4/2014 | Kuroishi | ........... | H04N 1/00342 |
| | | | | 358/1.14 |
| 2014/0101578 A1* | 4/2014 | Kwak | ................... | G06F 1/1647 |
| | | | | 715/761 |
| 2014/0104631 A1* | 4/2014 | Baba | ........................ | G06K 9/00 |
| | | | | 358/1.13 |
| 2014/0104636 A1* | 4/2014 | Baba | ................. | H04N 1/00904 |
| | | | | 358/1.14 |
| 2014/0355058 A1* | 12/2014 | Matsuhara | ......... | H04N 1/00381 |
| | | | | 358/1.15 |
| 2016/0100074 A1* | 4/2016 | Nishii | ............... | H04N 1/00925 |
| | | | | 358/1.14 |
| 2017/0223227 A1* | 8/2017 | Zhang et al. | .......... | H04N 1/393 |
| 2017/0374212 A1* | 12/2017 | Makiyama | ......... | H04N 1/00474 |
| 2018/0091667 A1* | 3/2018 | Yamasaki | .......... | H04N 1/00413 |
| 2019/0012056 A1* | 1/2019 | Kamoi | .................... | G06F 3/167 |
| 2019/0373127 A1* | 12/2019 | Tsuji | ..................... | G06F 3/1221 |
| 2020/0236233 A1* | 7/2020 | Fukuda | ................ | G06F 3/0482 |

FOREIGN PATENT DOCUMENTS

| | | |
|---|---|---|
| JP | 2004-233557 A | 8/2004 |
| JP | 2014-219712 A | 11/2014 |

* cited by examiner

IMAGE PROCESSING APPARATUS FOR CONTROLLING A SCANNER

CROSS-REFERENCE TO RELATED APPLICATIONS

This application is based on and claims priority under 35 USC 119 from Japanese Patent Application No. 2017-158895 filed on Aug. 21, 2017.

BACKGROUND

Technical Field

The present disclosure relates to an image processing apparatus.

Related Art

For example, Patent Literature 1 discloses a document reading apparatus in which when an opening/closing sensor is in an ON state and it is being detected that a cover is open, if a start key is operated, a control unit measures the time t when the start key is operated, and if the operation time t exceeds 3 seconds, the control unit waits for the operation time t to elapse after the end of the operation on the start key, and starts to read a document by a reading unit.

Also, for example, Patent Literature 2 discloses an image forming apparatus for reproducing the image of a document set on platen glass on a sheet. This image forming apparatus has a first start key provided on an operation panel so as to be usable to start a copying operation, a second start key configured to detect that the platen glass is pressed by a force having a predetermined magnitude or more, and start a copying operation in response to the pressing-force detection signal, and a selecting unit configured to validate the operation of at least one of the first and second start keys.

[Patent Literature 1] Japanese Patent Application Laid-Open No, 2004-233557

[Patent Literature 2] Japanese Patent Application Laid-Open No. 10-268708

SUMMARY

Sometimes, reading of the images of documents is performed by an image processing apparatus. For example, in the case where an operator puts a document on a platen with both hands, and performs a read start operation, the operator needs to take a hand from the document to perform the read start operation. Therefore, in a state where the document is out of place, reading may be performed.

Aspect of non-limiting embodiments of the present disclosure relates to reduce reading from being performing in a state where a document is out of place in the case of reading the image of the document, as compared to the configuration in which an input for reading is performed by operator's hands.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including: an image reading unit that reads an image of a document according to an instruction of an operator; an acquiring unit that acquires information on the operator performing document reading, or information on motions of the operator performed on the image processing apparatus in order to perform document reading; and a display that performs display for receiving an input for document reading, based on the line of sight, from the operator, when the information acquired by the acquiring unit satisfies a predetermined condition.

BRIEF DESCRIPTION OF DRAWINGS

Exemplary embodiment(s) of the present invention will be described in detail based on the following figures, wherein:

FIGS. 10A to 10C are views illustrating examples of screens which are displayed in the second example;

DETAILED DESCRIPTION

Hereinafter, an exemplary embodiment of the present invention will be described in detail with reference to the accompanying drawings.

<Appearance of Image Processing Apparatus>

Figure 1:
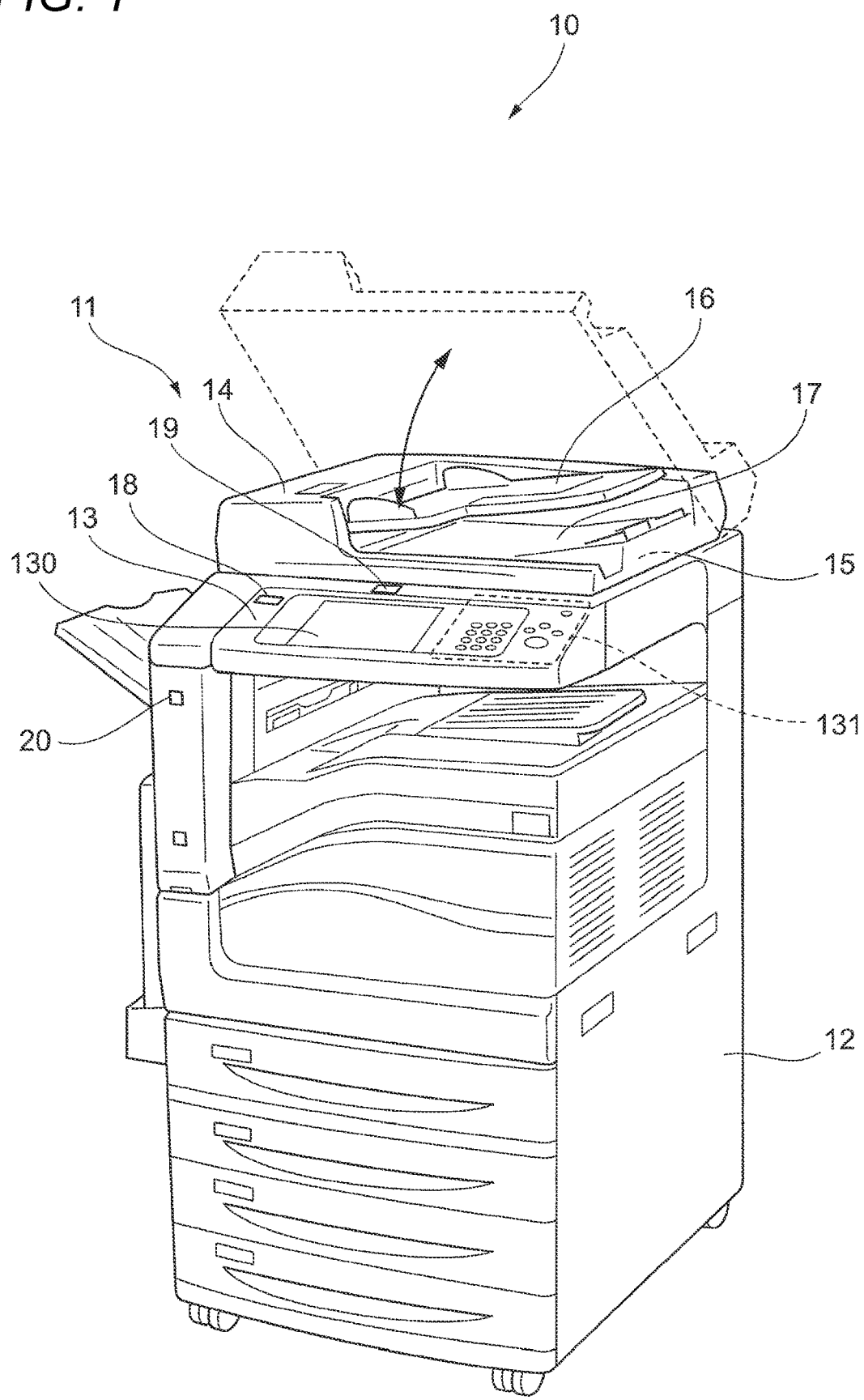
FIG. 1 is a perspective view illustrating an image processing apparatus according to an exemplary embodiment.

First, the appearance of an image processing apparatus 10 according to the present exemplary embodiment. FIG. 1 is a perspective view illustrating the image processing apparatus 10 according to the present exemplary embodiment. The image processing apparatus 10 according to the present exemplary embodiment is a so-called multi-function apparatus having various image processing functions, such as an image read function (a scan function), a print function, a copy function, a facsimile function, and so on.

The image processing apparatus 10 includes a scanner 11, a printer 12, and an user interface (UI) 13. Of them, the scanner 11 is a device for reading images formed on documents, and the printer 12 is a device for forming images on recording materials. Also, the user interface 13 is a device for receiving operator's operations (instructions) when an operator operates the image processing apparatus 10 and displaying a variety of information for the operator.

The scanner 11 of the present exemplary embodiment is disposed on the printer 12. Here, the scanner 11 includes a document holding member 14 provided such that it may be opened upwards and be closed downwards as shown by an arrow in FIG. 1, and a platen 15 on which documents may be put. According to this configuration, an operator may open the document holding member 14 upwards and put a document on the platen 15. Also, if the operator puts a document on the platen 15, and then returns the document holding member 14 to the original position (i.e. the operator closes the document holding member downwards), the document put on the platen 15 is pressed by the document holding member 14.

Also, the document holding member 14 includes a document housing part 16 for housing documents, and a document discharge part 17 onto which documents sent from the document housing part 16 are discharged. The scanner 11 reads the image of a document put on the platen 15, and the images of documents which are conveyed from the document housing part 16 toward the document discharge part 17.

The user interface 13 is attached to the scanner 11. The user interface 13 is disposed on the front side of the image processing apparatus 10 (the scanner 11) where the operator stands to operate the image processing apparatus 10. Further, the user interface 13 is disposed so as to face up such that the operator standing on the front side of the image processing apparatus 10 may operate the user interface while looking down the user interface from above.

Here, the user interface 13 includes a touch panel 130 and an operation button group 131. The touch panel 130 has a function of displaying a variety of information for the operator and receiving operator's inputs. Also, the operation button group 131 has a function of receiving operator's inputs.

Also, the image processing apparatus 10 includes a line-of-sight detection sensor 18, a first camera 19, and a second camera 20. The line-of-sight detection sensor 18 is attached to the left side of the user interface 13 so as to face up. The first camera 19 is attached to the upper side of the user interface 13. The second camera 20 is attached to the left side of the front side of the printer 12.

The line-of-sight detection sensor 18 has a function of detecting the line of sight of the operator being in the vicinity of the image processing apparatus 10. More specifically, the line-of-sight detection sensor 18 detects the line of sight of the operator directed to the touch panel 130 of the user interface 13. In the example shown in FIG. 1, the line-of-sight detection sensor 18 is attached to the left side of the user interface 13; however, the present disclosure is not limited to this configuration. The line-of-sight detection sensor 18 may be attached to any part where the line-of-sight detection sensor may detect the line of sight of the operator directed to the touch panel 130, and may be attached, for example, to a position within a predetermined range from the touch panel 130.

The first camera 19 is configured with a so-called video camera, and has a function of acquiring images. More specifically, the first camera 19 is disposed at a position where the first camera may image the platen 15 and the user interface 13, thereby acquiring images of the platen 15 and the user interface 13.

The second camera 20 also is configured with a so-called video camera, and has a function of acquiring images. More specifically, the second camera 20 is disposed at a position where the second camera may image the operator being in the vicinity of the image processing apparatus 10, and acquires images of the operator being in the vicinity of the image processing apparatus 10.

Also, the first camera 19 and the second camera 20 acquire still images and/or videos.

<Hardware Configuration of Image Processing Apparatus>

Figure 2:
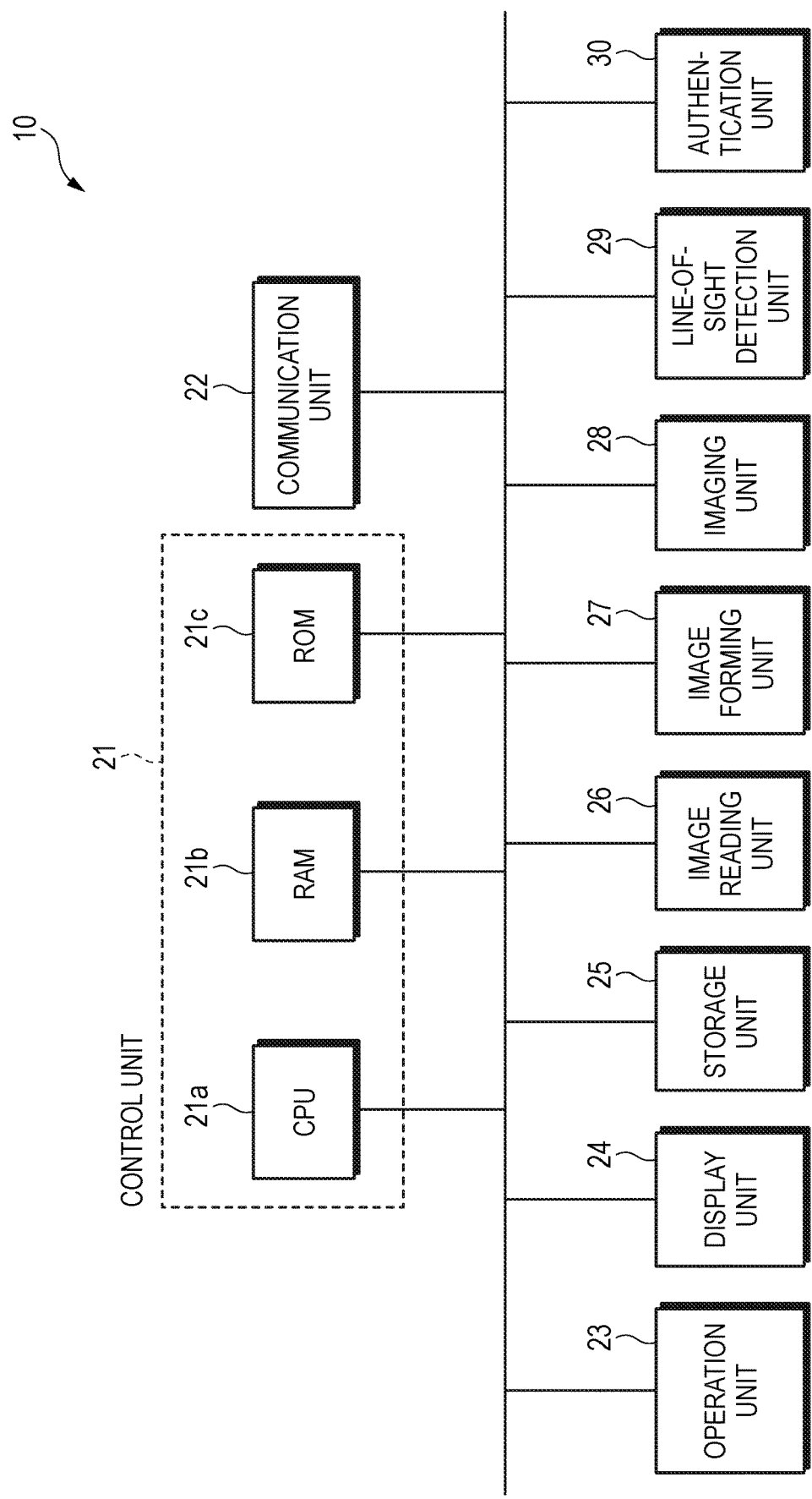
FIG. 2 is a block diagram illustrating an example of the hardware configuration of the image processing apparatus according to the exemplary embodiment.

Now, the hardware configuration of the image processing apparatus 10 according to the present exemplary embodiment will be described. FIG. 2 is a block diagram illustrating an example of the hardware configuration of the image processing apparatus 10 according to the present exemplary embodiment.

As shown in FIG. 2, the image processing apparatus 10 according to the present exemplary embodiment includes a control unit 21, a communication unit 22, an operation unit 23, a display unit 24, a storage unit 25, an image reading unit 26, an image forming unit 27, an imaging unit 28, a line-of-sight detection unit 29, and an authentication unit 30.

The control unit 21 controls the operations of individual units of the image processing apparatus 10. The control unit 21 is configured with a CPU (Central Processing Unit) 21a, a RAM (Random Access Memory) 21b, and a ROM (Read Only Memory) 21c.

The CPU 21a loads various programs stored in the ROM 21c and so on into the RAM 21b, and executes the programs, thereby implementing the individual functions of the image processing apparatus 10. The RAM 21b is a memory (a storage unit) usable as a work memory for the CPU 21a, and so on. The ROM 21c is a memory (a storage unit) for storing various programs to be executed by the CPU 21a, and so on.

The communication unit 22 is an interface for communication which may be connected to a communication line (not shown in the drawings). The communication unit 22 performs communication with client apparatuses and other image processing apparatuses (all of which are not shown in the drawings) via the communication line.

The operation unit 23 inputs information according to operator's operations to the control unit 21. In this example, the operation unit 23 is implemented by the touch panel 130 and the operation button group 131 provided in the user interface 13.

The display unit 24 displays a variety of information for the operator. In this example, the display unit 24 is implemented by the touch panel 130 provided in the user interface 13.

The storage unit 25 is a storage unit for storing a variety of data. As an example of the storage unit 25, a hard disk may be taken. The storage unit 25 stores various programs, a variety of data, and so on which may be used by the control unit 21.

The image reading unit 26 which is an example of an image reading unit reads the images of documents in response to instructions of the operator, and generates image data representing the read images. In this example, the image reading unit 26 is implemented by the scanner 11.

The image forming unit 27 forms images according to image data on sheet-like recording materials such as paper sheets. In this example, the image forming unit 27 is implemented by the printer 12. Also, the image forming unit 27 may form images by an electrophotographic system, or may form images by any other system.

The imaging unit 28 which is an example of an imaging unit images imaging subjects. In this example, the imaging unit 28 is implemented by the first camera 19 and the second camera 20.

The line-of-sight detection unit 29 has a function of detecting the line of sight of the operator being in the vicinity of the image processing apparatus 10. In this example, the line-of-sight detection unit 29 is implemented by the line-of-sight detection sensor 18.

The authentication unit 30 performs authentication of the operator when the operator tries to operate the image processing apparatus 10. For example, if the operator waves an IC (Integrated Circuit) card such as an employee ID card belonging to the operator over an IC card reader (not shown in the drawings) of the image processing apparatus 10, the operator is specified and authentication is performed. In this case, the authentication unit 30 is implemented by the card reader. Alternatively, for example, authentication may be performed on the basis of an image of the face of the operator acquired by the second camera 20. More specifically, for example, the operator is specified by comparing the face image acquired by the second camera 20 with face images registered in advance, and authentication is performed. In this case, the authentication unit 30 is implemented by a processing device for performing a process of specifying each operator by comparing a face image acquired by the second camera 20 with the face images regenerated in advance.

Further, in the image processing apparatus 10, under the control of the control unit 21, the scan function is implemented by the image reading unit 26, and the print function is implemented by the image forming unit 27, and the copy function is implemented by the image reading unit 26 and the image forming unit 27, and the facsimile function is implemented by the image reading unit 26, the image forming unit 27, and the communication unit 22.

<Functional Configuration of Control Unit>

Figure 3:
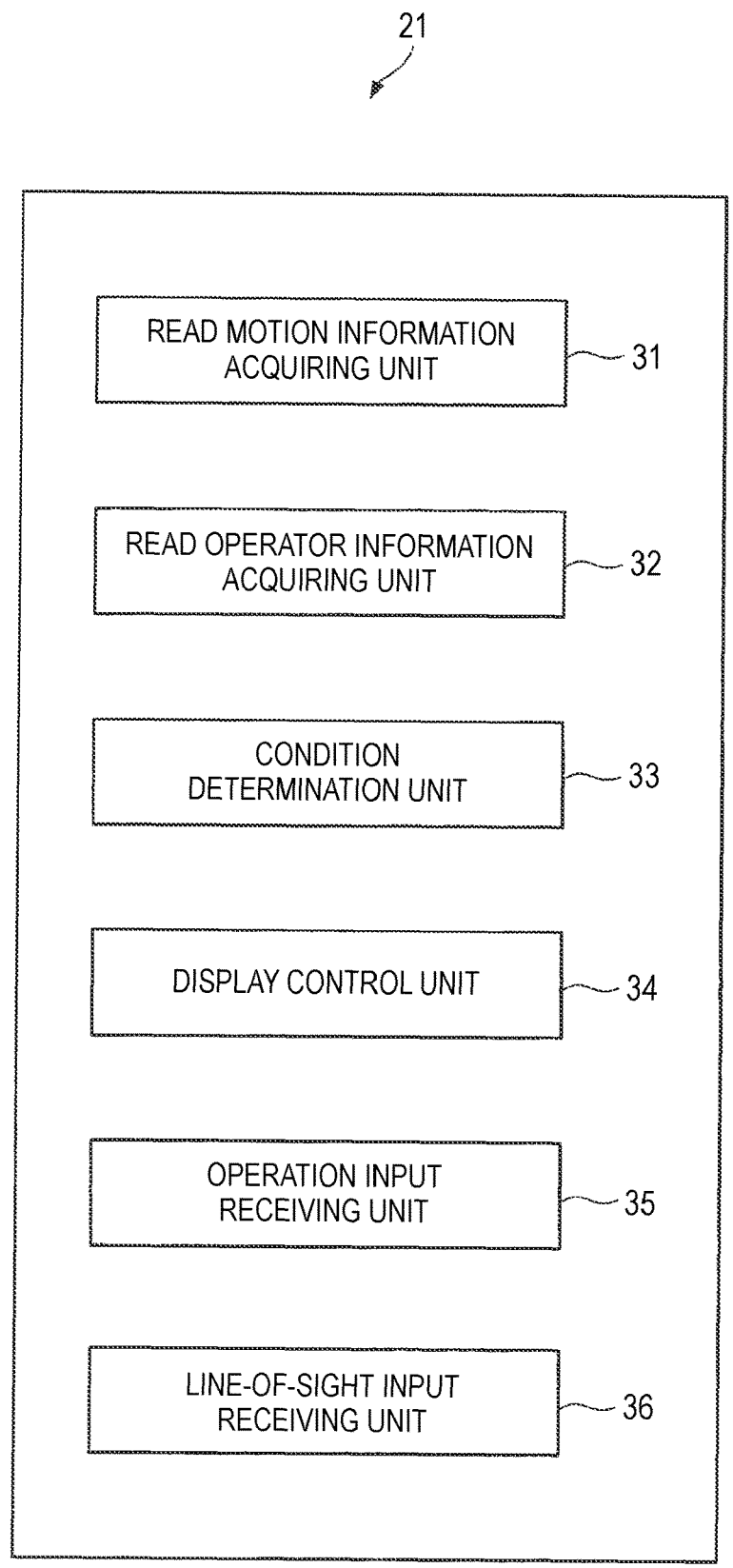
FIG. 3 is a block diagram illustrating an example of the functional configuration of a control unit.

Now, the functional configuration of the control unit 21 will be described. FIG. 3 is a block diagram illustrating an example of the functional configuration of the control unit 21. The control unit 21 includes a read motion information acquiring unit 31, a read operator information acquiring unit 32, a condition determination unit 33, a display control unit 34, an operation input receiving unit 35, and a line-of-sight input receiving unit 36.

The read motion information acquiring unit 31 which is an example of an acquiring unit acquires information on motions of the operator performed on the image processing apparatus 10 in order to perform document reading (hereinafter, referred to as read motion information). Read motion information is, for example, information representing an image of the platen 15 and an image of the user interface 13 acquired by imaging of the first camera 19, and the magnitude of pressing force by which the platen 15 is pressed. Details of read motion information will be described below.

The read operator information acquiring unit 32 which is an example of an acquiring unit acquires information on an operator which performs document reading using the image processing apparatus 10 (hereinafter, referred to as read operator information). Read operator information is, for example, information on an image of an operator acquired by imaging of the second camera 20 and the operator specified by the authentication unit 30. Details of read operator information will be described below.

The condition determination unit 33 determines whether read motion information or read operator information satisfies a predetermined condition.

The display control unit 34 which is an example of a display performs display for receiving an operator's input based on the line of sight and related to document reading if the condition determination unit 33 determines that read motion information or read operator information satisfies the predetermined condition. Here, the display control unit 34 displays an image for receiving an operator's input based on the line of sight and related to document reading (hereinafter, referred to as a read input image) on the touch panel 130. This read input image is used as an example of an image for specifying the line of sight of an operator.

That is to say, for example, in the case of performing reading of a document having a spread part and composed of two or more sheets (hereinafter, referred to as a spread document), the operator may perform reading while pressing the document set on the platen 15 with both hands to keep the document in place. In the present exemplary embodiment, in order to validate an operator's input based on the line of sight in such a situation, such a condition that it may be assumed that both hands of the operator are full is determined in advance, and if it is determined that this condition is satisfied, the display control unit 34 displays the read input image.

Hereinafter, the predetermined condition is also referred to as the line-of-sight input condition. Details of the line-of-sight input condition will be described below.

The operation input receiving unit 35 receives inputs based on operator's operations. Here, the operation input receiving unit 35 receives operator's inputs by detecting touch operations which the operator performs on the user interface 13. For example, the operation input receiving unit 35 receives selection of the copy function by detecting that an icon for the copy function displayed on a menu screen has been pressed.

The line-of-sight input receiving unit 36 which is an example of a receiving unit receives operator's inputs based on the line of sight. Here, the line-of-sight input receiving unit 36 acquires information on a position which the operator is looking at (hereinafter, referred to as line-of-sight position information), from the line-of-sight detection sensor 18, for example, regularly (for example, at intervals of 100 ms). Further, on the basis of the acquired line-of-sight position information, the line-of-sight input receiving unit receives an operator's input based on the line of sight. More specifically, the line-of-sight input receiving unit 36 specifies the line of sight of the operator on the basis of the acquired line-of-sight position information, and determines whether the operator is looking at the read input image. If determining that the operator is looking at the read input image, the line-of-sight input receiving unit receives an input according to the position which the operator is looking at.

For example, if it is determined that the operator is looking at a "Start" button for the copy function displayed on the read input image, the line-of-sight input receiving unit 36 receives an input for performing the copy function. Then, the copy function is performed. In other words, image reading of the image reading unit 26 and image formation of the image forming unit 27 are performed. Also, for example, if it is determined that the operator is looking at a "Return to Setting" button displayed on the read input image, the line-of-sight input receiving unit 36 receives an input for displaying a setting screen for the copy function. Then, the setting screen for the copy function is displayed. In other words, the display control unit 34 displays the setting screen for the copy function.

In other words, the line-of-sight input receiving unit 36 assumes an orthogonal coordinate system, on the touch panel 130 (see FIG. 1). For example, the line-of-sight input receiving unit assumes that the upper left corner of the touch panel 130 is the origin O1 (0, 0), and the coordinates of the touch panel 130 in the horizontal direction are X coordinates, and the coordinates of the touch panel 130 in the vertical direction are Y coordinates. Also, the line-of-sight input receiving unit 36 acquires, for example, information on the X coordinate and the Y coordinate of the position which the operator is looking at, as line-of-sight position information. Subsequently, on the basis of the information on the X coordinate and the Y coordinate which the operator is looking at, and information on the X coordinate and the Y coordinate of the position of the read input image, the line-of-sight input receiving unit 36 determines whether the operator is looking at the read input image and which position the operator is looking at.

Also, in the present exemplary embodiment, even when the read input image is displayed, inputs based on operator's touch operations are possible. In other words, even when the read input image is displayed, the operation input receiving unit 35 receives inputs based on operator's operations.

Also, the individual functional units constituting the control unit 21 shown in FIG. 3 are implemented by cooperation between software resources and hardware resources. Specifically, in the case where the image processing apparatus 10 is implemented with the hardware configuration shown in FIG. 2, an OS program and application programs stored in the ROM 21c are loaded into the RAM 21b, and are executed by the CPU 21a, whereby the functional units such as the read motion information acquiring unit 31, the read operator information acquiring unit 32, the condition determination unit 33, the display control unit 34, the operation input receiving unit 35, and the line-of-sight input receiving unit 36 are implemented.

<Configuration of Line-of-Sight Detection Sensor>

Figure 4:
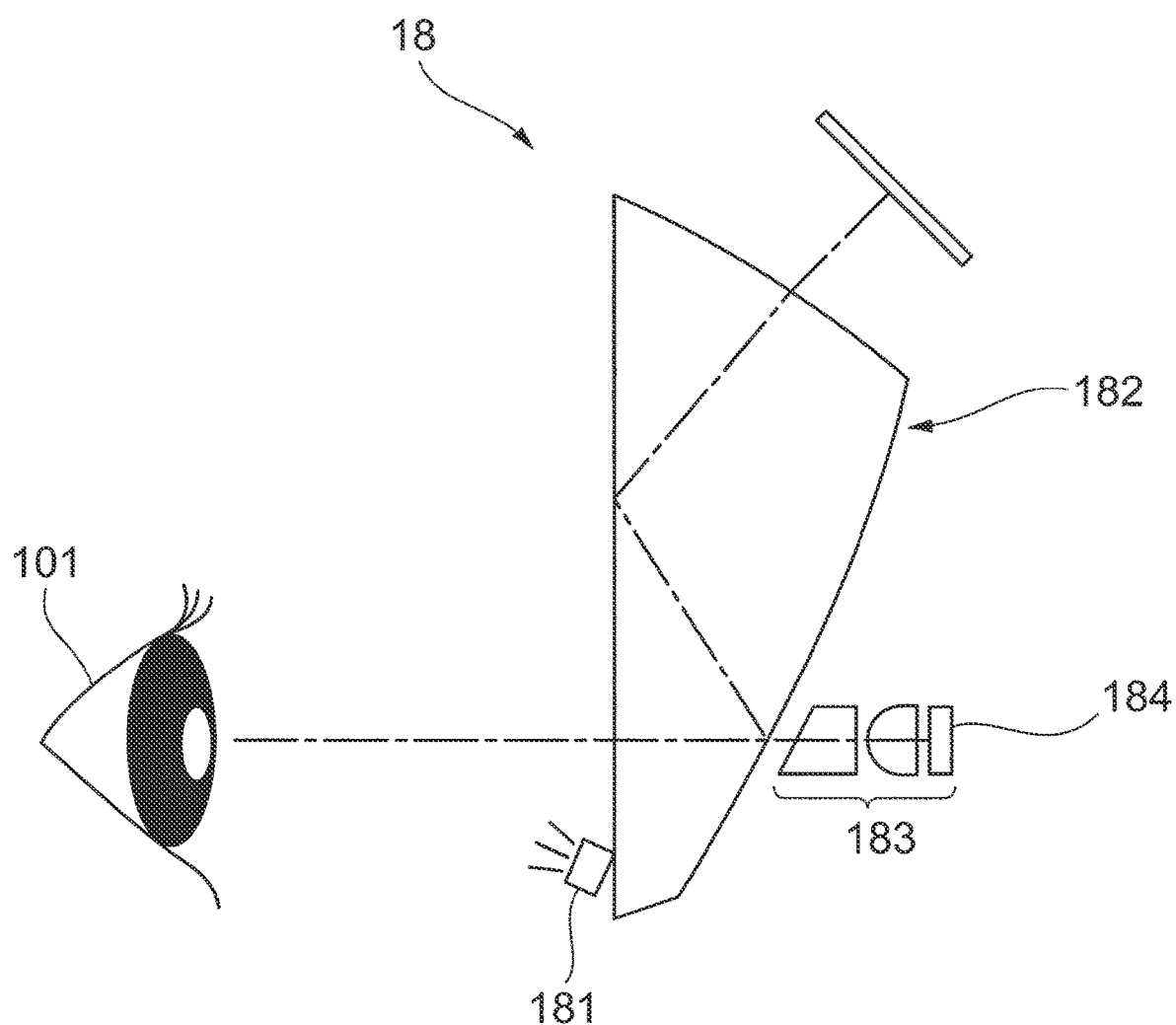
FIG. 4 is a view for explaining an example of the configuration of a line-of-sight detection sensor.
Figure 5A:
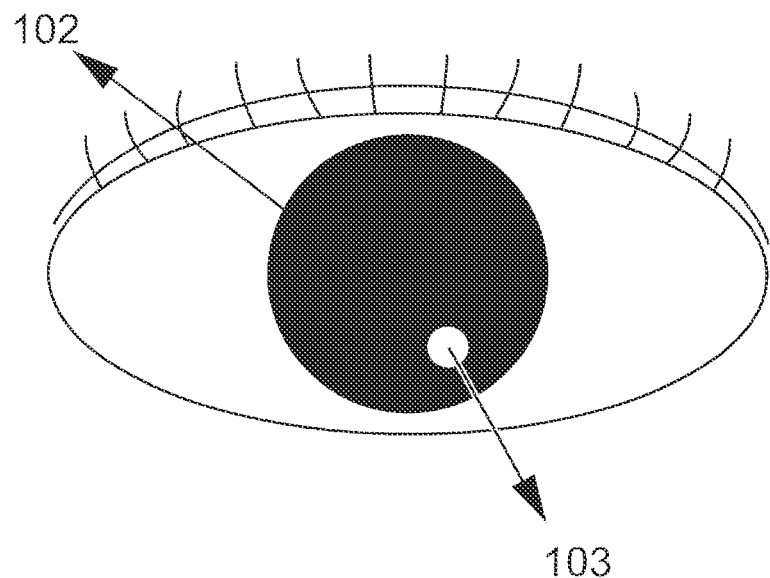
FIGS. 5A and 5B are views for explaining an example of the configuration of the line-of-sight detection sensor.
Figure 5B:
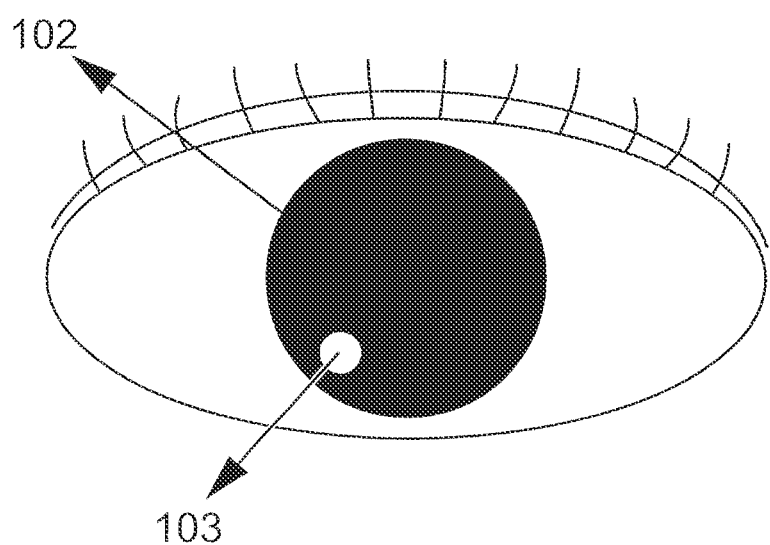

Now, the configuration of the line-of-sight detection sensor 18 (see FIG. 1) will be described. FIG. 4 and FIGS. 5A and 5B are views for explaining an example of the configuration of the line-of-sight detection sensor 18.

As shown in FIG. 4, the line-of-sight detection sensor 18 has a light source 181 for irradiating an operator's eye ball 101 with an infrared beam in a spot shape, and the infrared beam reflected from the eye ball 101 enters an optical lens group 183 through a fine aperture stop formed in an ocular lens 182. The optical lens group 183 focuses the reflected infrared beam onto the imaging surface of a CCD 184 in a dot shape, and the CCD 184 converts a virtual image (a Purkinje image) formed on the imaging surface due to corneal reflection into an electrical signal, and outputs the electrical signal.

As shown in FIGS. 5A and 5B, this virtual image is a virtual image 103 of a pupil 102 formed by corneal reflection of the infrared beam radiated from the light source 181 (see FIG. 4), and the relative positional relationship between the center of the pupil 102 and the virtual image 103 changes in proportion to the rotation angle of the eye ball 101. In the present exemplary embodiment, image processing is performed using the electrical signal representing the virtual image and received from the CCD 184, and on the basis of the result of the image processing, the line of sight of the operator (the direction of the line of sight of the operator, i.e. the position which the operator is looking at) is detected.

However, detection of the line of sight of the operator may be performed by any other well-known method, and is not limited to the method shown in FIG. 4 and FIGS. 5A and 5B.

Also, as the line-of-sight detection sensor 18, for example, an eye tracker made by Tobii Technology K.K may be used.

<Description of Read Motion Information, Read Operator Information, and Line-of-Sight Input Condition>

Now, the read motion information, the read operator information, and the line-of-sight input condition will be described in detail. As described above, such a condition that it may be assumed that both hands of the operator are full is determined as the line-of-sight input condition in advance, and the condition determination unit 33 determines whether the read motion information or the read operator information satisfies the line-of-sight input condition. Here, the case where the read motion information satisfies the line-of-sight input condition and the case where the read operator information satisfies the line-of-sight input condition will be described separately.

First, the case where the read motion information satisfies the line-of-sight input condition will be described.

In this case, the line-of-sight input condition is a condition defining such an operator's motion that it may be assumed that both hands of the operator are full. Also, the read motion information which is used in determination is information on operator's motions performed on the components of the image processing apparatus 10 such as the platen 15, the document holding member 14, and the user interface 13. On the basis of the read motion information, the condition determination unit 33 determines whether the motion defined in the line-of-sight input condition has been performed by the operator.

More specifically, for example, a condition in which both hands of the operator should be on the platen 15 may be determined as the line-of-sight input condition. In this case, the read motion information is information on operator's motions performed on the platen 15, and is, for example, an image of the platen 15 acquired by imaging of the first camera 19. On the basis of the image of the platen 15, the control unit 16 determines whether both hands of the operator are on the platen 15. For example, in the case where the image of the platen 15 includes image information on both hands of the operator, the condition determination unit 33 determines that the read motion information satisfies the line-of-sight input condition.

Here, in the case where the operator is pressing a document against the platen 15 with both hands, it may be considered that the platen 15 is being pressed by a force having a predetermined magnitude or more. For this reason, for example, a condition in which the platen 15 should be being pressed by a force equal to or larger than a predetermined threshold in a state where the document holding member 14 is open may be determined as the line-of-sight input condition. In this case, the read motion information is information representing the magnitude of the pressing force which is applied to the platen 15 in the state where the document holding member 14 is open. On the basis of this read motion information, the condition determination unit 33 determines whether the pressing force which is applied to the platen 15 is equal to or larger than the predetermined threshold.

Also, it may be considered that the magnitude of the pressing force when the operator presses a document against the platen 15 is different from the magnitude of the pressing force when the document holding member 14 presses a document in a state where the document holding member 14 is closed. For this reason, the pressing force when the document holding member 14 is closed may be measured in advance, and in the case where the platen 15 is being pressed by a force having a magnitude different from the magnitude of the measured pressing force, it may be determined that the line-of-sight input condition is satisfied. Also, since it may be considered that the magnitude of the pressing force when the operator presses a document against the platen 15 falls within a predetermined range, in the case where the platen 15 is being pressed by the force having a magnitude within the predetermined range, it may be determined that the line-of-sight input condition is satisfied. As described above, the line-of-sight input condition may be considered as a condition based on an operator's motion which is performed on the platen 15 or a condition based on the magnitude of the pressing force which is applied to the platen 15.

Also, in the case where the operator is not performing any operation on the user interface 13, the operator may be pressing a document against the platen 15 with both hands. For this reason, for example, a condition in which the hands (fingers) of the operator should not be on the user interface 13 for a predetermined time may be determined as the line-of-sight input condition. In this case, the read motion information is information on operator's motions performed on the user interface 13, and is, for example, images of the user interface 13 acquired by imaging of the first camera 19. On the basis of images of the user interface 13, the condition determination unit 33 determines whether both hands of the operator are on the user interface 13. For example, if image information on the hands of the operator are not included in images of the user interface 13 for the predetermined time, the condition determination unit 33 determines that the read motion information satisfies the line-of-sight input condition.

Also, the line-of-sight input condition may be limited to the state where the document holding member 14 is open. In other words, a condition in which the hands (fingers) of the operator should not be on the user interface 13 for the predetermined time in the state where the document holding member 14 is open may be determined as the line-of-sight input condition. As described above, the line-of-sight input condition may be considered as a condition based on an operator's motion which is performed on the user interface 13.

Also, normally, document reading is performed in the state where the document holding member 14 is closed. Therefore, in the case where the document holding member 14 is open upward, the operator may be pressing a document against the platen 15 with both hands. For this reason, for example, a condition in which the document holding member 14 should be open for a predetermined time may be determined as the line-of-sight input condition. In this case, the read motion information is information on operator's motions performed on the document holding member 14, and is, for example, information representing that the document holding member 14 has been opened and closed. On the basis of this read motion information, the condition determination unit 33 determines whether the document holding member 14 has been open for the predetermined time. As described above, the line-of-sight input condition may be considered as a condition based on operation motions which are performed on the document holding member 14.

Also, in the case where the operator has selected an option for reading spread documents (hereinafter, referred to as a book option), it may be considered that the operator will press a spread document against the platen 15 with both hands. For example, for example, a condition in which the book option should be selected may be determined as the line-of-sight input condition. In this case, the read motion information is information on operator's motions performed on the user interface 13, in other words, information representing an image read condition (an image read mode) set by the operator. If this read motion information represents that the book option has been selected, the condition determination unit 33 determines that the read motion information satisfies the line-of-sight input condition.

However, the embodiments of the present invention is not limited to the book option, and in the case where a specific image read mode has been selected by the operator, it may be determined that the line-of-sight input condition is satisfied. The specific image read mode is an image read mode different from a normal image read mode (for example, the copy function and the scan functions with standard settings), and the operator or the like may set a desired image read mode as the specific image read mode in advance.

Also, after the specific image read mode such as the book option is selected, if a document is put on the platen 15, it may be determined that the line-of-sight input condition is satisfied. In this case, the read motion information is information on operator's motions performed on the platen 15, and is information representing whether any document has been put on the platen 15 (i.e. whether any document is on the platen 15). After the book option (the specific image read mode) is selected, on the basis of the read motion information, the condition determination unit 33 determines whether any document has been put on the platen 15. Also, in the case where a document has been put on the platen 15, it is detected by the platen 15 that the document has been put thereon, and the read motion information acquiring unit 31 acquires the corresponding information as the read motion information.

Additionally, in the case where the specific image read mode such as the book option has been selected, it is also possible to use the line-of-sight input condition for the normal image read mode, such as a condition in which both hands of the operator are on the platen 15. In other words, in the specific image read mode, separately from the line-of-sight input condition for the normal image read mode or in addition to that condition, the line-of-sight input condition in which a document should be on the platen 15 may be used.

Now, the case where the read operator information satisfies the line-of-sight input condition will be described.

In this case, the line-of-sight input condition is a condition defining such an operator's state that it may be assumed that both hands of the operator are full. Also, the condition determination unit 33 determines whether the read operator information represents the operator's state defined in the line-of-sight input condition.

For example, in the case where the operator is holding a load, on the occasion of reading a document, both hands may be full. For example, the operator may be holding the load with both hand, or may be holding the load with one hand while pressing the document with the other hand. For this reason, for example, a condition in which the operator should be holding a load may be determined as the line-of-sight input condition. In this case, the read operator information is an image of the operator acquired by imaging of the second camera 20. On the basis of the image of the operator, the condition determination unit 33 determines whether the operator is holding a load. Also, which parts the operator should be holding a load in may be limited. For example, a line-of-sight input condition in which the operator should be holding a load in both hands or a line-of-sight input condition in which the operator should be holding in one hand may be determined.

Similarly, even in the case where the operator has injuries to any hand (or arm), on the occasion of reading a document, the operator may not be able to use both hands. For example, for example, a condition in which the operator should have injuries to any hand (or arm) may be determined as the line-of-sight input condition. In this case, the read operator information is an image of the operator acquired by imaging of the second camera 20. On the basis of the image of the operator, the condition determination unit 33 determines whether the operator has injuries to any hand. Also, which parts the operator should have injuries to may be limited. For example, a line-of-sight input condition in which the operator should have injuries to both hands, or a line-of-sight input condition in which the operator should have injuries to one hand may be determined.

Also, for example, even in the case where the operator is a disabled person, on the occasion of reading a document, the operator may not be able to use both hands. For this reason, for example, a condition in which the operator should be a disabled person may be determined as the line-of-sight input condition. In this case, the read operator information is an image of the operator acquired by imaging of the second camera 20. On the basis of the image of the operator, the condition determination unit 33 determines whether the operator is a disabled person. Also, which part should have a disability may be limited. For example, a line-of-sight input condition in which the operator should have a disability in any hand may be determined.

Here, information on people with injuries and disabled people of operators who may operate the image processing apparatus 10 may be registered in advance. Thereafter, the condition determination unit 33 may compare information on an operator specified by the authentication unit 30 with the information registered in advance, to determine whether the operator of the image processing apparatus 10 has injuries, whether the operator is a disabled person, or the like. In this case, the read operator information is information of the operator specified by the authentication unit 30.

Also, in the case where the condition determination unit 33 determines whether the line-of-sight input condition is satisfied, on the basis of images acquired by the first camera 19 and the second camera 20, an image analysis technique according to the related art may be used. For example, in order to determine whether both hands of the operator are on the platen 15, images of the cases where both hands are on the platen 15 are registered in advance. Thereafter, the condition determination unit 33 compares an image of the platen 15 with the images registered in advance, to determine whether both hands of the operator are on the platen 15. Also, for example, in order to determine whether the operator has injuries to any hand, images of the cases where hands have injuries are registered in advance. Thereafter, the condition determination unit 33 compares an image of the operator with the images registered in advance, to determine whether an operator has injuries to any hand.

Also, of the above-mentioned line-of-sight input conditions, some conditions such as the condition in which both hands of the operator should be on the platen 15, the condition in which the operator should be holding a load, the condition in which the operator should have injuries to any hand, the condition in which the operator should have a disability in any hand, and the condition in which the hands of the operator should not be on the user interface 13 for the predetermined time may be said as conditions related to the state of the hands of the operator. Also, in this case, the read motion information and the read operator information may be considered as information representing the state of the hands of the operator. Further, on the basis of the read motion information or the read operator information, the condition determination unit 33 determines whether the hands of the operator is in a predetermined state.

Also, the condition determination unit 33 may use any one condition of the above-mentioned line-of-sight input conditions as a condition for determination, or may use two or more conditions of the above-mentioned line-of-sight input conditions as conditions for determination. Also, in the case where the condition determination unit 33 uses two or more conditions as conditions for determination, the display control unit 34 may display the read input image in the case where any one condition is satisfied, or may display the read input image in the case where two or more conditions are satisfied.

As described above, such a condition that it may be assumed that both hands of the operator are full is set as a line-of-sight input condition. However, actually, it is assumed that even though both hands of the operator are not full, if the line-of-sight input condition is satisfied, the read input image is displayed.

<Procedure of Process of Displaying Read Input Image and Receiving Inputs>

Figure 6:
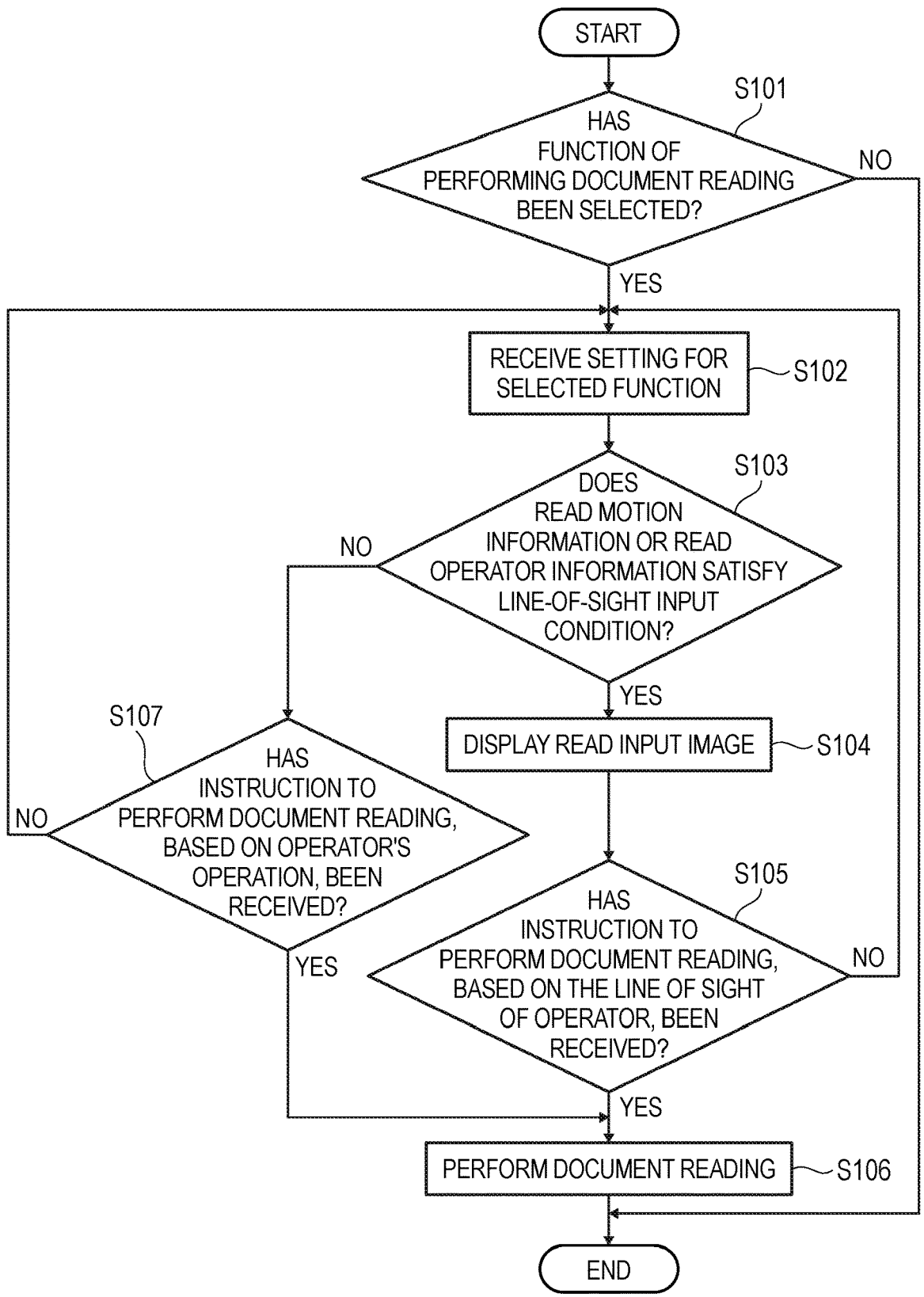
FIG. 6 is a flow chart illustrating an example of a process procedure for displaying a read input image and receiving an input based on the line of sight of an operator.

Now, the procedure of a process of displaying the read input image and receiving inputs based on the line of sight of the operator. FIG. 6 is a flow chart illustrating an example of the process procedure for displaying the read input image and receiving inputs based on the line of sight of the operator.

First, the operation input receiving unit 35 determines whether a function of performing document reading (for example, the copy function, the scan function, or the like) has been selected by the operator (STEP S101). In the case where the determination result of STEP S101 is negative ("NO"), the processing flow ends. Meanwhile, in the case where the determination result of STEP S101 is positive ("YES"), the setting screen for receiving setting for the function (the function of performing document reading) selected by the operator is displayed on the touch panel 130. Then, as the operator performs operations on the setting screen, the operation input receiving unit 35 receives setting for the selected function (STEP S102).

After setting is performed by the operator, the condition determination unit 33 determines whether the read motion information or the read operator information satisfies the line-of-sight input condition (STEP S103). In other words, on the basis of the read operator information acquired by the read operator information acquiring unit 32 or the read motion information acquired by the read motion information acquiring unit 31, the condition determination unit 33 determines whether the line-of-sight input condition is satisfied.

In the case where the determination result of STEP S103 is positive ("YES"), the display control unit 34 displays the read input image on the touch panel 130 (STEP S104). Next, the line-of-sight input receiving unit 36 determines whether an instruction to perform document reading, based on the line of sight of the operator looking at the read input image, has been received (STEP S105). In the case where the determination result of STEP S105 is positive ("YES"), document reading is performed (STEP S106). Then, the processing flow ends. Meanwhile, in the case where the determination result of STEP S105 is negative ("NO"), the processing flow proceeds to STEP S102.

Also, in the case where the determination result of STEP S103 is negative ("NO"), the operation input receiving unit 35 determines whether an instruction to perform document reading, based on an operator's operation, has been received (STEP S107). In the case where the determination result of STEP S107 is positive ("YES"), the processing flow proceeds to STEP S106, and document reading is performed. Meanwhile, in the case where the determination result of STEP S107 is negative ("NO"), the processing flow proceeds to STEP S102.

However, since the read motion information is information on operator's motions, it may be said as information changing with time. For this reason, in the determination of STEP S103, the read motion information acquired immediately before the determination is used. Meanwhile, the read operator information is information on the operator, and does not change with time. For this reason, the read operator information may be acquired at a timing before the determination of STEP S103, for example, at the timing of the process of STEP S101 or STEP S102.

Also, in STEP S104, the display control unit 34 may be configured to display the read input image in the case where the operator is looking at the touch panel 130. In other words, the display control unit 34 may be configured to display the read input image in the case where it is determined that the line-of-sight input condition is satisfied and it is determined that the operator is looking at the touch panel 130.

Also, in the above-described example, the condition determination unit 33 is configured to perform the determination of STEP S103 after the process of STEP S102; however, it is not limited to this configuration. For example, it may be considered that in the case of performing document reading with standard settings (default settings), the operator does not input any setting in STEP S102. For this reason, for example, after the process of STEP S101, the process of STEP S103 and the subsequent processes thereof may be performed. Alternatively, for example, while setting of the operator is received in STEP S102, the process of STEP S103 and the subsequent processes thereof may be performed.

<Specific Examples of Process of Displaying Read Input Image and Receiving Inputs>

Now, the process of displaying the read input image and receiving inputs based on the line of sight of the operator will be described taking specific examples (first to third examples).

First Example

First, a first example will be described. In the first example, after the operator selects the copy function, if the platen 15 is pressed by both hands, the read input image is displayed. In other words, in this example, the line-of-sight input condition is the condition in which both hands of the operator should be on the platen 15.

Figure 7:
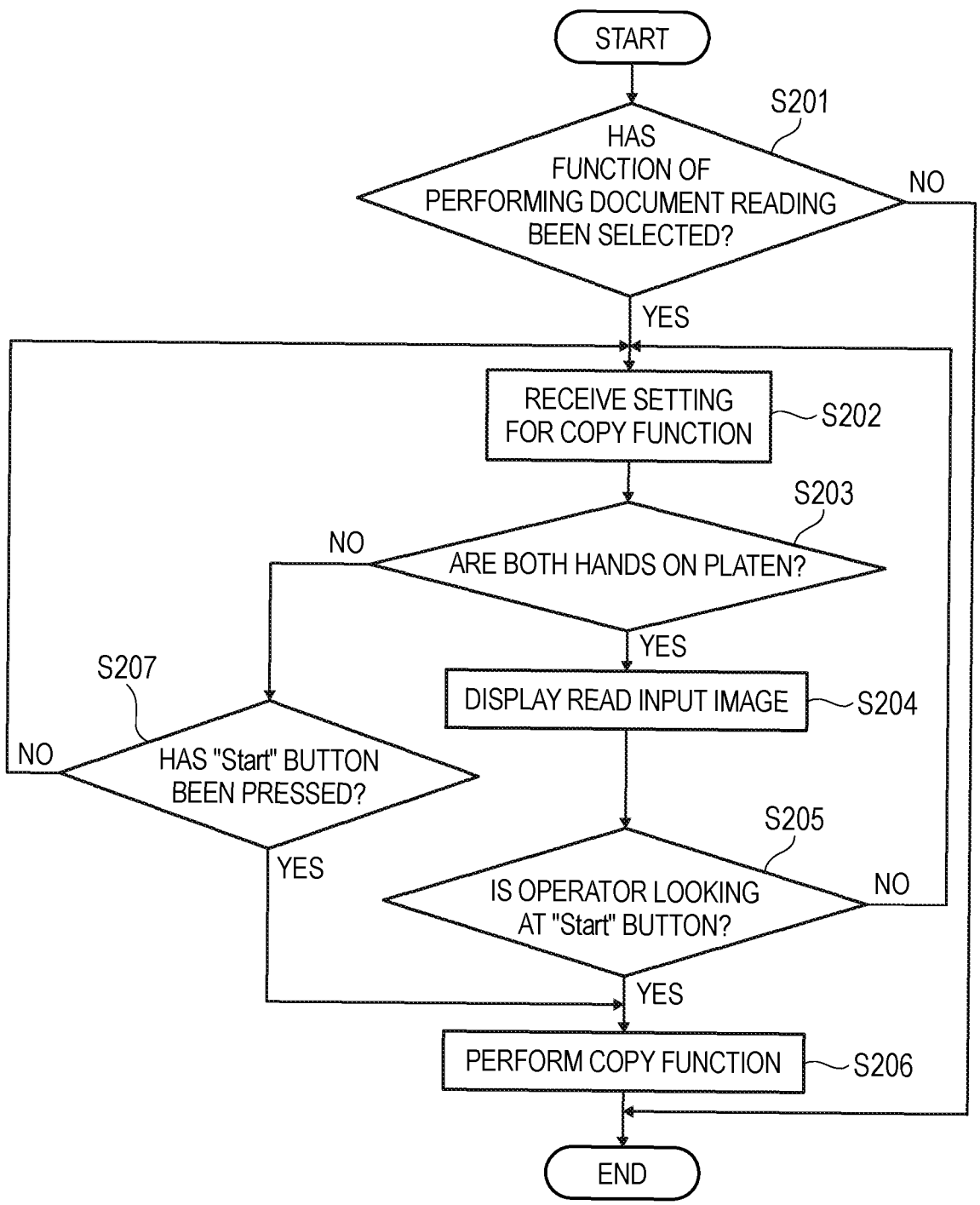
FIG. 7 is a flow chart illustrating a process procedure of a first example.
Figure 8A:
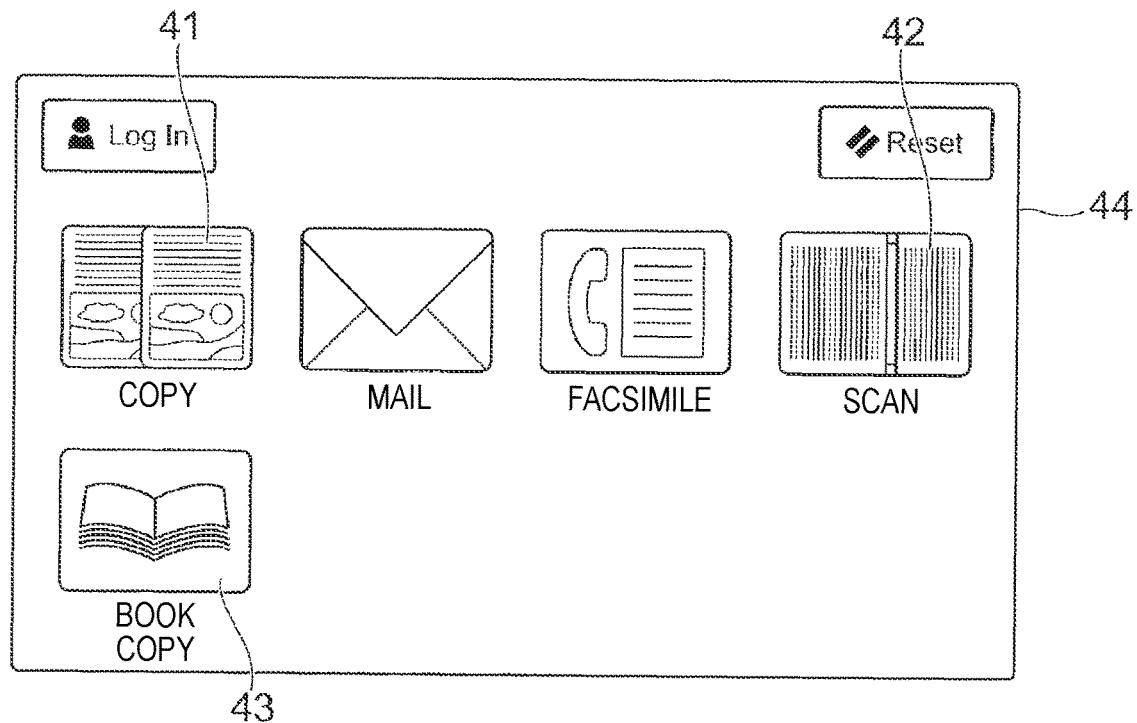
FIGS. 8A to 8C are views illustrating examples of screens which are displayed in the first example.
Figure 8B:
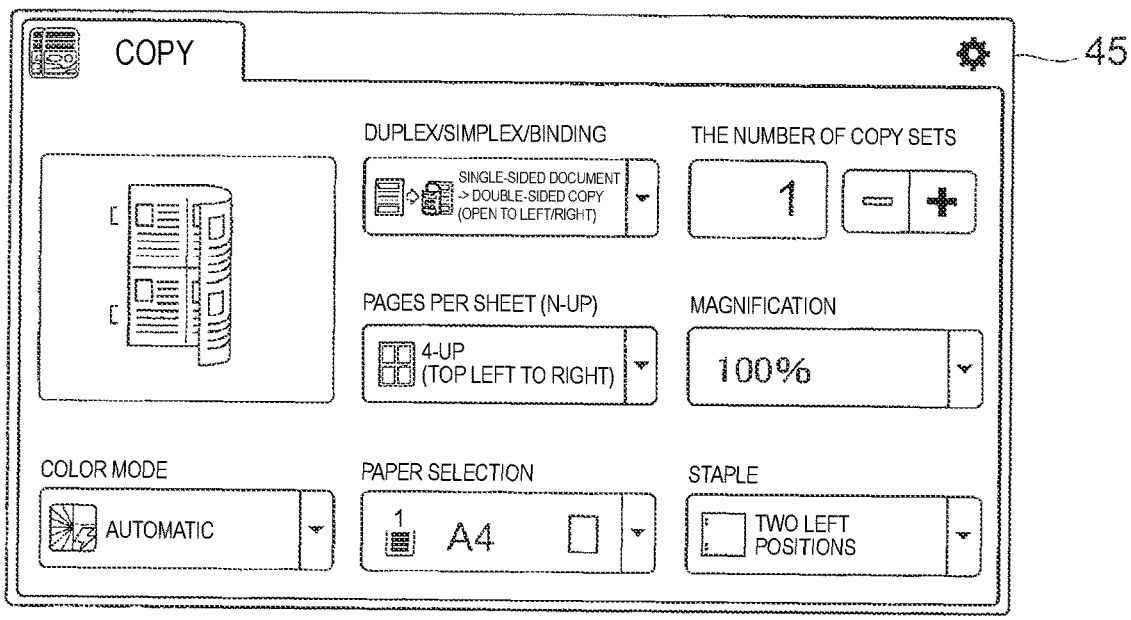
Figure 8C:
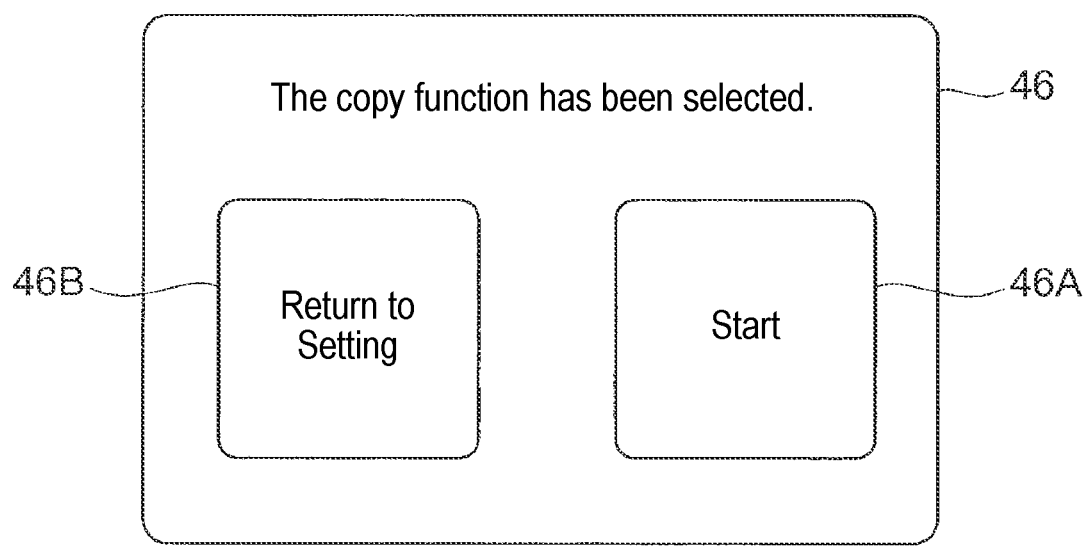

FIG. 7 is a flow chart illustrating a process procedure of the first example. Also, FIGS. 8A to 8C are views illustrating examples of screens which may be displayed in the first example. With reference to FIG. 7 and FIGS. 8A to 8C, the process of the first example will be described.

First, on the touch panel 130, a menu screen 44 shown in FIG. 8A is displayed. In the menu screen 44, various icons representing functions executable in the image processing apparatus 10 are displayed. Here, the operation input receiving unit 35 determines whether a function of performing document reading has been selected by the operator (STEP S201). In the case where the determination result of STEP S201 is negative ("NO"), the processing flow ends. Meanwhile, in the case where the operator has selected an icon 41 for the copy function shown in FIG. 8A, the operation input receiving unit 35 determines that the copy function has been selected, so the determination result of STEP S201 becomes positive ("YES").

In the case where it is determined in STEP S201 that the copy function has been selected ("YES" in STEP S201), the display control unit 34 displays a setting screen 45 shown in FIG. 8B, as a setting screen for receiving setting for the copy function. As the operator performs operations on the setting screen 45, the operation input receiving unit 35 receives settings for the copy function (STEP S202). Here, for example, the operation input receiving unit receives settings such as the paper size for forming images and the number of copy sets. Next, on the basis of the read motion information acquired by the read motion information acquiring unit 31, the condition determination unit 33 determines whether both hands of the operator are on the platen 15 (STEP S203).

In the case where the determination result of STEP S203 is positive ("YES"), the display control unit 34 displays a read input image 46 shown in FIG. 8C (STEP S204). The read input image 46 includes a "Start" button 46A and a "Return to Setting" button 46B. Here, the line-of-sight input receiving unit 36 determines whether the operator is looking at the "Start" button 46A (STEP S205).

In the case where the determination result of STEP S205 is positive ("YES"), the copy function is performed (STEP S206). Then, the processing flow ends. Meanwhile, in the case where the determination result of STEP S205 is negative ("NO"), the processing flow proceeds to STEP S202. Besides, the determination result of STEP S205 becomes negative, for example, in the case where the operator is looking at the "Return to Setting" button 46B, the case where the operator has not looked at any of the "Start" button 46A and the "Return to Setting" button 46B for a predetermined time, and so on.

Also, in the case where the determination result of STEP S203 is negative ("NO"), the operation input receiving unit 35 determines whether a "Start" button for performing the copy function has been pressed by an operator's operation (STEP S207). This "Start" button is a button different from the "Start" button 46A of the read input image 46, and is a button for receiving an input based on an operator's touch operation. In the case where the determination result of STEP S207 is positive ("YES"), the processing flow proceeds to STEP S206. Meanwhile, in the case where the determination result of STEP S207 is negative ("NO"), the processing flow proceeds to STEP S202.

Second Example

Now, a second example will be described. In the second example, after the operator selects the scan function, if the platen 15 is pressed by a force having the predetermined magnitude or more, a read input image is displayed. In other words, in this example, the line-of-sight input condition is the condition in which the platen 15 should be pressed by a force equal to or larger than the predetermined threshold in the state where the document holding member 14 is open.

Figure 9:
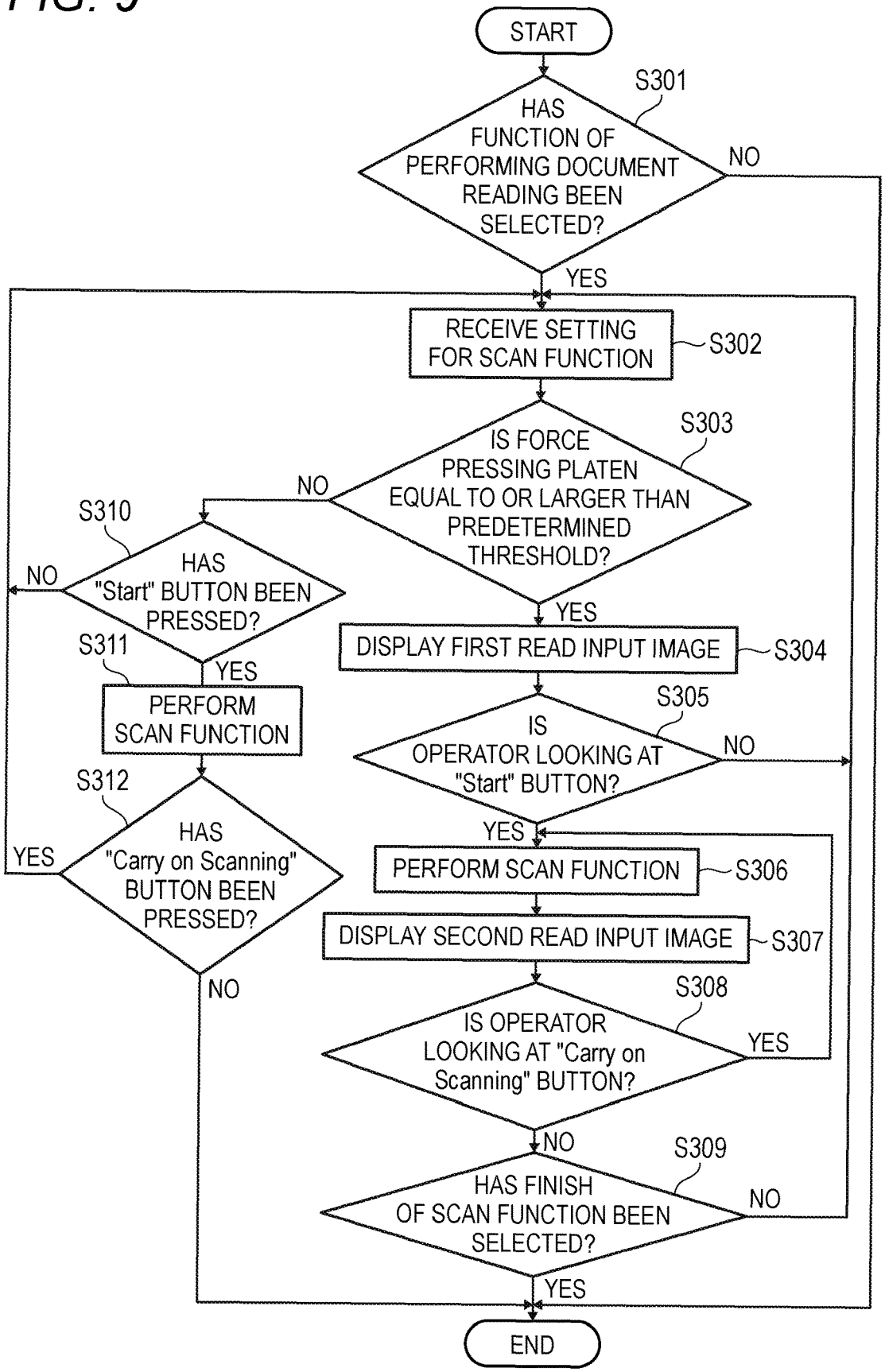
FIG. 9 is a flow chart illustrating a process procedure of a second example.
Figure 10A:
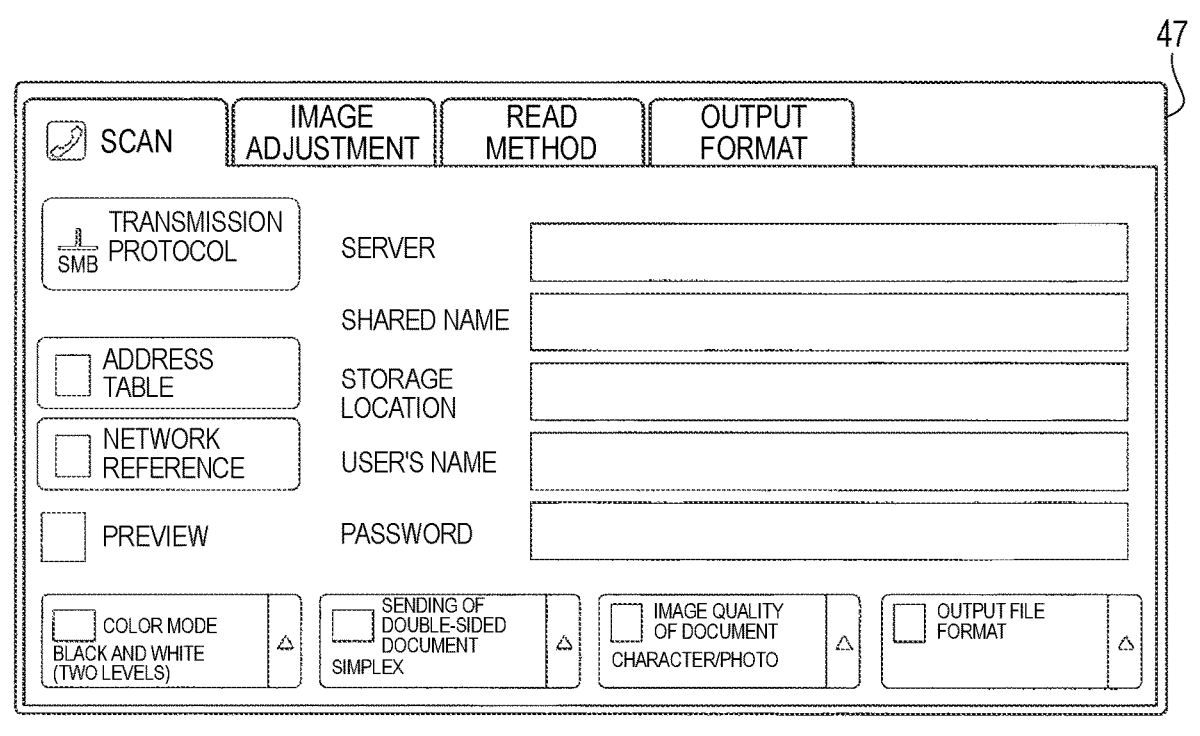
Figure 10B:
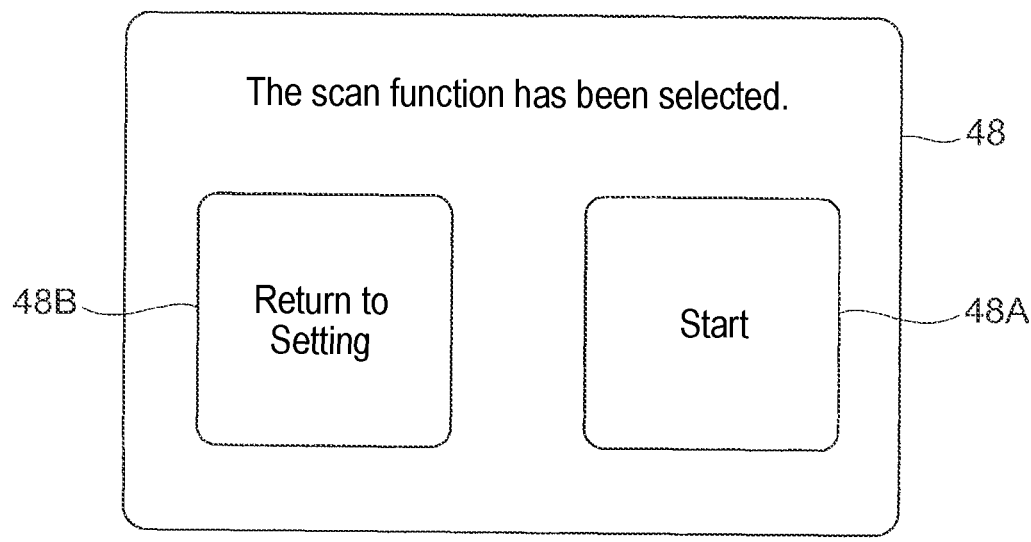
Figure 10C:
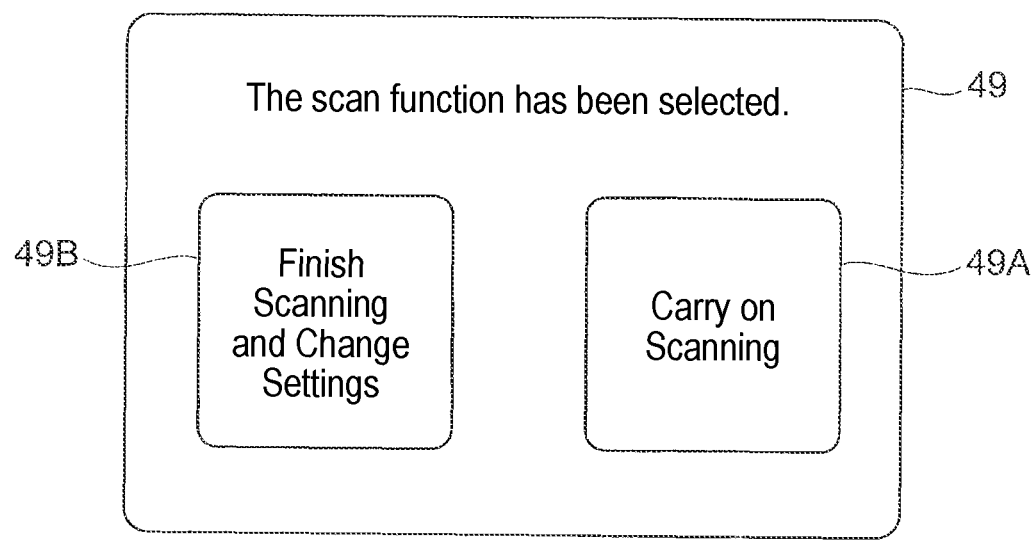

FIG. 9 is a flow chart illustrating a process procedure of the second example. Also, FIGS. 10A to 10C are views illustrating examples of screens which may be displayed in the second example. With reference to FIG. 9 and FIGS. 10A to 10C, the process of the second example will be described.

First, on the touch panel 130, the menu screen 44 shown in FIG. 8A is displayed. Here, the operation input receiving unit 35 determines whether a function of performing document reading has been selected by the operator (STEP S301). In the case where the determination result of STEP S301 is negative ("NO"), the processing flow ends. Meanwhile, in the case where the operator has selected an icon 42 for the scan function shown in FIG. 8A, the operation input receiving unit 35 determines that the copy function has been selected, so the determination result of STEP S301 becomes positive ("YES").

In the case where it is determined in STEP S301 that the scan function has been selected ("YES" in STEP S301), the display control unit 34 displays a setting screen 47 shown in FIG. 10A, as a setting screen for receiving setting for the scan function. As the operator performs operations on the setting screen 47, the operation input receiving unit 35 receives settings for the scan function (STEP S302). Here, for example, the operation input receiving unit receives settings such as color setting (color or black-and-white) and an address for image data which is generated by the scan function. Next, on the basis of the read motion information acquired by the read motion information acquiring unit 31, the condition determination unit 33 determines whether the force pressing the platen 15 in the state where the document holding member 14 is open is equal to or larger than the predetermined threshold, or not (STEP S303).

In the case where the determination result of STEP S303 is positive ("YES"), the display control unit 34 displays a first read input image 48 shown in FIG. 10B (STEP S304). The first read input image 48 includes a "Start" button 48A and a "Return to Setting" button 48B. Here, the line-of-sight input receiving unit 36 determines whether the operator is looking at the "Start" button 48A (STEP S305).

In the case where the determination result of STEP S305 is positive ("YES"), the scan function is performed (STEP S306). Meanwhile, in the case where the determination result of STEP S305 is negative ("NO"), the processing flow proceeds to STEP S302. Besides, the determination result of STEP S305 becomes negative, for example, in the case where the operator is looking at the "Return to Setting" button 48B, the case where the operator has not looked at any of the "Start" button 48A and the "Return to Setting" button 48B for a predetermined time, and so on.

Also, after the scan function is performed in the STEP S306, the display control unit 34 displays a second read input image 49 (STEP S307). On this second read input image 49, a "Carry on Scanning" button 49A and a "Finish Scanning and Change Settings" button 49B are displayed. Here, the line-of-sight input receiving unit 36 determines whether the operator is looking at the "Carry on Scanning" button 49A (STEP S308). In the case of carrying on the scan function, the operator needs to set the next document (for example, the next page) on the platen 15.

In the case where the determination result of STEP S308 is positive ("YES"), the processing flow proceeds to STEP S306, and the scan function is carried on. Meanwhile, in the case where the determination result of STEP S308 is negative ("NO"), the setting screen 47 shown in FIG. 10A is displayed. Besides, the determination result of STEP S308 becomes negative, for example, in the case where the operator is looking at the "Finish Scanning and Change Settings" button 49B, the case where the operator has not looked at any of the "Start" button 49A and the "Finish Scanning and Change Settings" button 49B for a predetermined time, and so on.

After the setting screen 47 is displayed, the operation input receiving unit 35 determines whether finish of the scan function has been selected by the operator (STEP S309). In the case where the determination result of STEP S309 is positive ("YES"), the processing flow ends. Meanwhile, in the case where the determination result of STEP S309 is negative ("NO"), the processing flow proceeds to STEP S302.

Also, in the case where the determination result of STEP S303 is negative ("NO"), the operation input receiving unit 35 determines whether a "Start" button for performing the scan function has been pressed by an operator's operation (STEP S310). This "Start" button is a button different from the "Start" button 48A of the first read input image 48, and is a button for receiving an input based on an operator's touch operation. In the case where the determination result of STEP S310 is negative ("NO"), the processing flow proceeds to STEP S302. Meanwhile, in the case where the determination result of STEP S310 is positive ("YES"), the scan function is performed (STEP S311).

Next, the operation input receiving unit 35 determines whether a "Carry on Scanning" button has been pressed by an operator's operation (STEP S312). This "Carry on Scanning" button is also different from the "Carry on Scanning" button 49A of the second read input image 49, and is a button for receiving an input based on an operator's touch operation. In the case where the determination result of STEP S312 is negative ("NO"), the processing flow proceeds to STEP S302. Meanwhile, in the case where the determination result of STEP S312 is negative ("NO"), the processing flow ends.

Third Example

Now, a third example will be described. In the third example, after the operator selects the book option, if a document is put on the platen 15, a read input image is displayed. In other words, in this example, as the line-of-sight input condition for the case where the book option is selected, the condition in which a document should be on the platen 15 is determined in advance. Also, it is assumed that a book copy function which is as an example of the book option and is a function for performing spread-document copying is selected.

Figure 11:
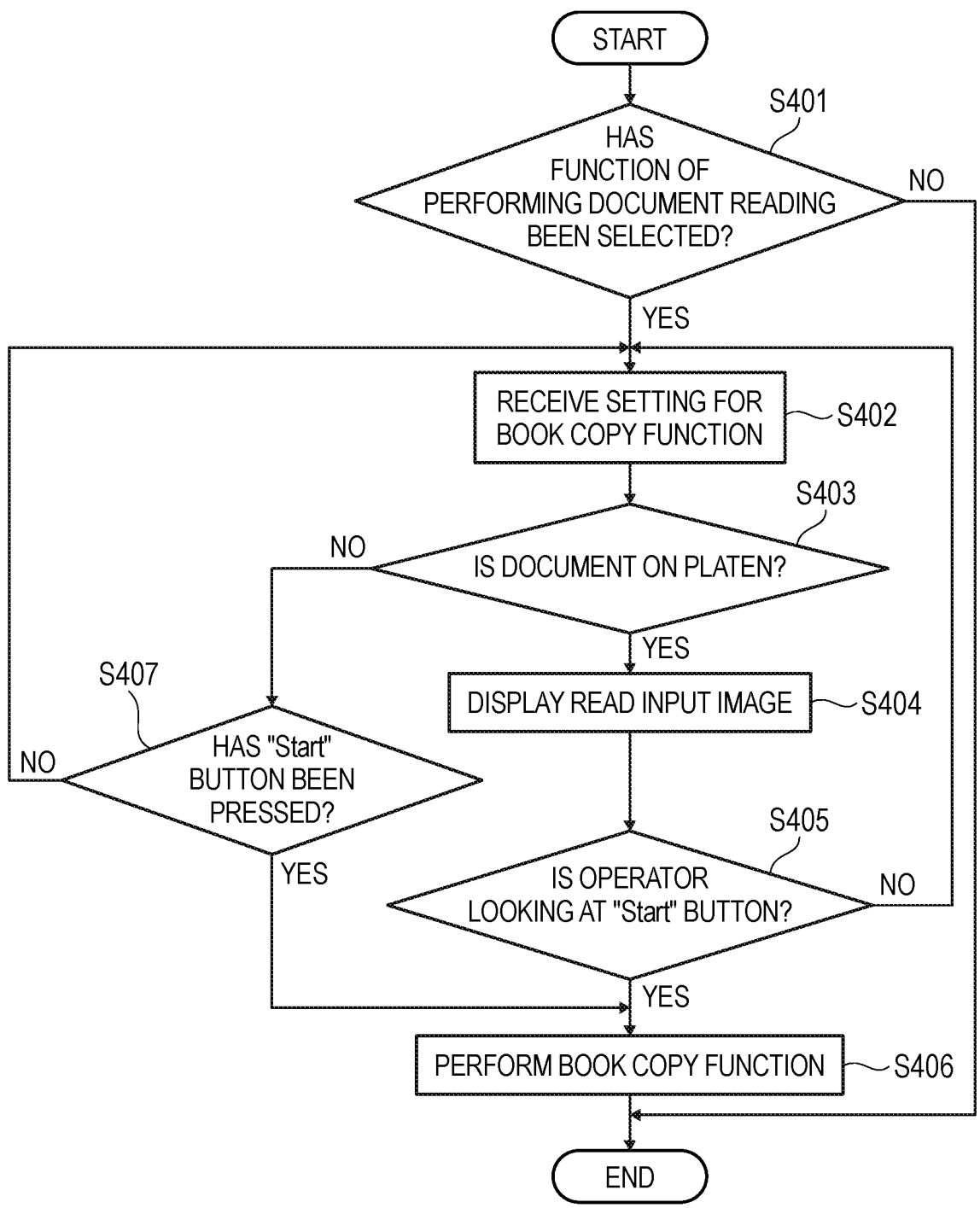
FIG. 11 is a flow chart illustrating a process procedure of a third example.
Figure 12A:
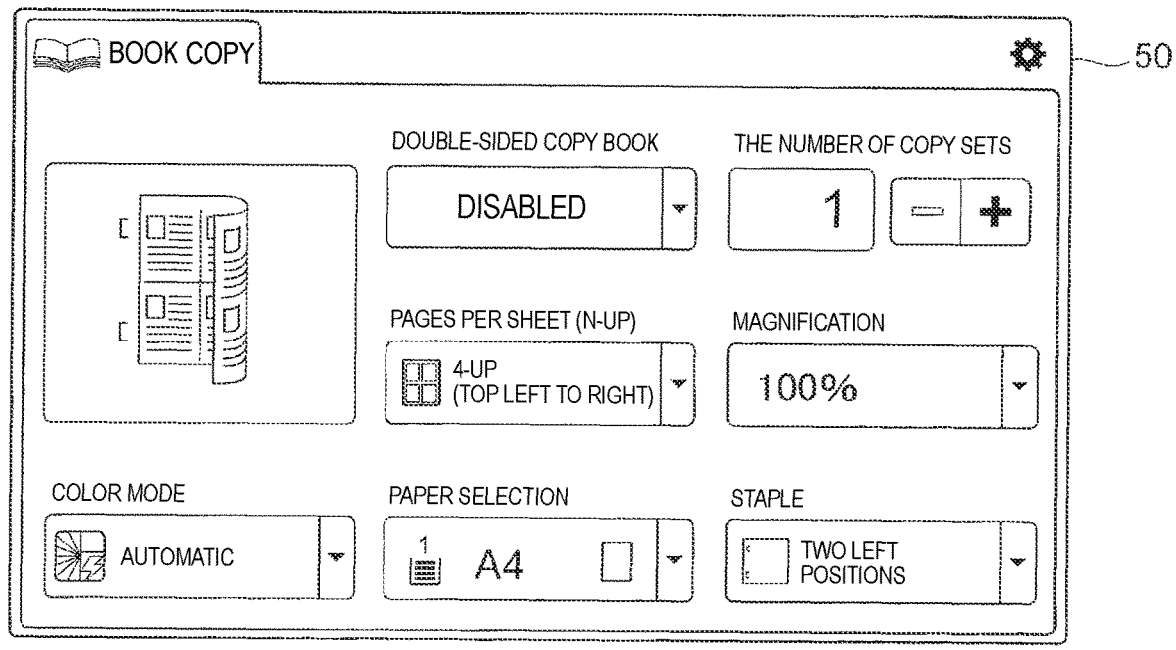
FIGS. 12A and 12B are views illustrating examples of screens which are displayed in the third example.
Figure 12B:
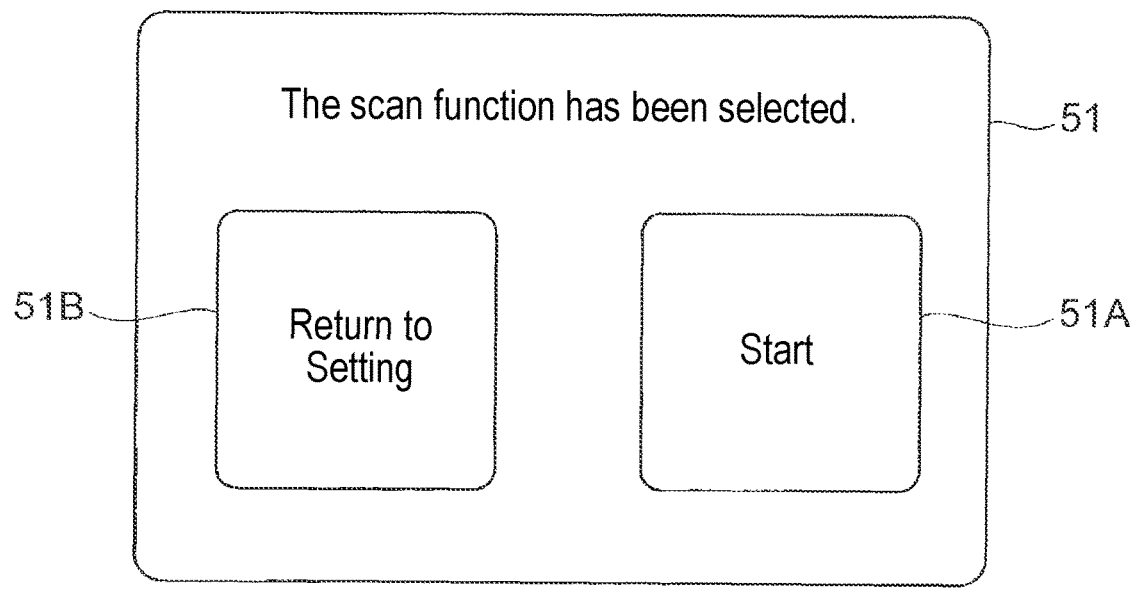

FIG. 11 is a flow chart illustrating a process procedure of the third example. Also, FIGS. 12A and 12B are views illustrating examples of screens which may be displayed in the third example. With reference to FIG. 11 and FIGS. 12A and 12B, the process of the third example will be described.

First, on the touch panel 130, the menu screen 44 shown in FIG. 8A is displayed. Here, the operation input receiving unit 35 determines whether a function of performing document reading has been selected by the operator (STEP S401). In the case where the determination result of STEP S401 is negative ("NO"), the processing flow ends. Meanwhile, in the case where the operator has selected an icon 43 for the book copy function shown in FIG. 8A, the operation input receiving unit 35 determines that the book copy function has been selected, so the determination result of STEP S401 becomes positive ("YES").

In the case where it is determined in STEP S401 that the book copy function has been selected ("YES" in STEP S401), the display control unit 34 displays a setting screen 50 shown in FIG. 12A, as a setting screen for receiving setting for the book copy function. As the operator performs operations on the setting screen 50, the operation input receiving unit 35 receives settings for the book copy function (STEP S402). On this setting screen 50, for example, a setting item "DOUBLE-SIDED COPY BOOK" is displayed. This item "DOUBLE-SIDED COPY BOOK" is an item for setting whether to make a double-sided copy of a bound document such that the spread state does not change, and is a setting item unique to the book copy function, and is not displayed on the setting screen 45 for the copy function shown in FIG. 8B.

Next, the condition determination unit 33 determines whether any document has been put on the platen 15 (STEP S403).

In the case where the determination result of STEP S403 is positive ("YES"), the display control unit 34 displays a read input image 51 shown in FIG. 12B (STEP S404). The read input image 51 includes a "Start" button 51A and a "Return to Setting" button 51B. Here, the line-of-sight input receiving unit 36 determines whether the operator is looking at the "Start" button 51A (STEP S405).

In the case where the determination result of STEP S405 is positive ("YES"), the facsimile function is performed (STEP S406). Then, the processing flow ends. Meanwhile, in the case where the determination result of STEP S405 is negative ("NO"), the processing flow proceeds to STEP S402. Besides, the determination result of STEP S405 becomes negative, for example, in the case where the operator is looking at the "Return to Setting" button 51B, the case where the operator has not looked at any of the "Start" button 51A and the "Return to Setting" button 51B for a predetermined time, and so on.

Also, in the case where the determination result of STEP S403 is negative ("NO"), the operation input receiving unit 35 determines whether a "Start" button for performing the book copy function has been pressed by an operator's operation (STEP S407). This "Start" button is a button different from the "Start" button 51A of the read input image 51, and is a button for receiving an input based on an operator's touch operation. In the case where the determination result of STEP S407 is positive ("YES"), the processing flow proceeds to STEP S406. Meanwhile, in the case where the determination result of STEP S407 is negative ("NO"), the processing flow proceeds to STEP S402.

As described above, in the case where the read motion information or the read operator information satisfies the predetermined condition, the image processing apparatus 10 according to the present exemplary embodiment displays the read input image, and receives inputs based on the line of sight of the operator. In the case of performing document reading, the operator may adjust, for example, the deviation in the position or angle of a document put on the platen 15. However, for example, in the case where the operator is pressing a spread document with both hands in order to read the document, or in the case where the operator is holding a load, or has injuries to any hand, both hands of the operator may be full. In such a case, if the operator takes any hand from the document in order to perform a read start operation, in a state where the document is out of place, reading may be performed.

For this reason, in the image processing apparatus 10 according to the present exemplary embodiment, in the case where the predetermined condition is satisfied, the read input image is displayed, so reading may be started without separating any operator's hand from the document. Therefore, for example, as compared to the configuration in which an input for reading is performed by the hands of the operator, reading is reduced from being performed in the state where a document is out of place. Also, in the image processing apparatus 10 according to the present exemplary embodiment, on the basis of the line of sight of the operator, reading is started. Therefore, as compared to the configuration in which after a document is put on the platen 15, if a predetermined time elapses, reading is started, it becomes easier to perform reading at the timing intended by the operator.

Also, in the above-described examples, such a condition that it may be assumed that both hands of the operator are full is set as the line-of-sight input condition; however, the embodiments of the present invention is not limited to this configuration. In the present exemplary embodiment, regardless of whether both hands of the operator are full, such a condition that it may be assumed that there is an obstacle to operation of the operator may be set as the line-of-sight input condition. In other words, the condition of the case where the operability is lower as compared to the case where both hands of the operator are free (the operator may use both hands) may be set as the line-of-sight input condition. As an example of such a case, the case where one hand of the operator is in use may be taken.

For example, it may be considered that in the case where the operator is pressing a document with one hand, and the other hand is free, depending on where the touch panel 130 is disposed, as compared to the configuration in which the touch panel 130 is operated by the other hand, the configuration in which an input based on the line of sight is received makes it easier for the operator to start reading. For this reason, such a condition that it may be assumed that one hand of the operator is in use may be set as the line-of-sight input condition in advance. Even in this case, document reading may be started by the line of sight of the operator.

Also, a program for implementing the exemplary embodiment of the present disclosure may be provided by a communication tool, and may also be stored in recording media such as CD-ROMs to be provided.

Also, although various exemplary embodiments and modifications (examples) have been described, the exemplary embodiments and the modifications (examples) may be combined.

Also, the present disclosure is not limited to the above-described exemplary embodiments, and may be implemented in various forms without departing from the gist of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An apparatus comprising:
   a scanner configured to scan an image of a document according to an instruction of an operator;
   at least one processor configured to acquire information about a line of sight of the operator; and
   a display,
   wherein the at least one processor is configured to control the display to display a screen configured to receive an input for controlling the scanner using the acquired information about the line of sight of the operator,
   wherein the at least one processor is configured to acquire information representing a state of hands of the operator, and
   wherein the at least one processor is configured to, if the acquired information representing the state of hands of the operator represents that the state of hands of the operator is a predetermined state, then control the display to display the screen.

2. The apparatus according to claim 1, wherein the at least one processor is configured to acquire information about a motion of the operator performed on a platen configured to receive the document or performed on a document holding member configured to be opened and closed to press the document put on the platen, and
   wherein the at least one processor is configured to, if the acquired information about the motion of the operator represents that a predetermined operation has been performed on the platen or the document holding member, then control the display to display the screen.

3. The apparatus according to claim 2, wherein the at least one processor is configured to acquire a magnitude of a pressing force which is applied to the platen, and
   wherein the at least one processor is configured to, if the acquired magnitude of the pressing force when the document holding member is open is equal to or larger than a predetermined threshold, then control the display to display the screen.

4. The apparatus according to claim 2, wherein the at least one processor is configured to acquire information representing that the document holding member has been opened and closed, and
   wherein the at least one processor is configured to, if the acquired information representing that the document holding member has been opened and closed indicates that an open state of the document holding member has been maintained for a predetermined time, then control the display to display the screen.

5. The apparatus according to claim 1, further comprising:
   at least one camera configured to image a platen configured to receive the document,
   wherein the at least one processor is configured to acquire an image acquired by the at least one camera, as the information representing the state of hands of the operator, and
   wherein the at least one processor is configured to, if the image acquired by the at least one processor shows that both hands of the operator are on the platen, then control the display to display the screen.

6. The apparatus according to claim 1, wherein the at least one processor is configured to acquire an image read condition set by the operator, and
   wherein the at least one processor is configured to, if the image read condition acquired by the at least one processor represents that a setting has been performed for reading a document comprising a spread part and a plurality of sheets, then control the display to display the screen.

7. The apparatus according to claim 6, wherein the at least one processor is configured to, after the setting has been performed, if a document is put on a platen, then control the display to display the screen.

8. An apparatus comprising:
   a scanner configured to scan an image of a document according to an instruction of an operator;
   a display; and
   at least one processor configured to control the display to display a screen configured to receive an input for controlling the scanner, using a line of sight of the operator, if a setting for reading spread documents is set,
   wherein the at least one processor is configured to acquire information representing a state of hands of the operator, and
   wherein the at least one processor is configured to, if the acquired information representing the state of hands of the operator represents that the state of hands of the operator is a predetermined state, then control the display to display the screen.

9. An apparatus comprising:
   at least one processor configured to acquire information about a specific image read mode selected by an operator, wherein the specific image read mode is different from a normal image read mode; and
   a display;
   wherein the at least one processor is configured to control the display to display an image configured to specify a line of sight of the operator if the specific image read mode has been selected; and
   wherein the at least one processor is configured to receive an input for document reading, using the line of sight, by specifying the line of sight of the operator looking at the image displayed on the display,
   wherein the at least one processor is configured to acquire information representing a state of hands of the operator, and
   wherein the at least one processor is configured to, if the acquired information representing the state of hands of the operator represents that the state of hands of the operator is a predetermined state, then control the display to display the image.

10. The apparatus according to claim 1, wherein the at least one processor is configured to acquire the information about the line of sight of the operator if the operator is issuing the instruction.

11. The apparatus according to claim 10, wherein the instruction comprises an instruction for the scanner to perform document scanning.

12. The apparatus according to claim 1, wherein the at least one processor is configured to control the display to display the screen in response to the acquired information about the line of sight of the operator satisfying a predetermined condition.

13. The apparatus according to claim 1, wherein the at least one processor is configured to control the display to display the screen in response to determining that a setting has been set for the scanner to scan a spread document comprising a spread part and a plurality of sheets, and
   wherein the screen is configured to receive the input for controlling the scanner using the acquired information about the line of sight of the operator when the line of sight of the operator is directed at the display.

14. The apparatus according to claim 1, wherein the at least one processor is configured to control the display to display the screen in response to determining that a setting has been set for the scanner to scan a spread document while all hands of the operator are holding the spread document in place,
   wherein the screen is configured to receive the input for controlling the scanner using the acquired information about the line of sight of the operator when the line of sight of the operator is directed at the display, and
   wherein the spread document comprises a spread part and a plurality of sheets.

* * * * *